United States Patent [19]

Miyazaki et al.

[11] Patent Number: 4,841,427
[45] Date of Patent: Jun. 20, 1989

[54] CAPACITIVE VOLTAGE LOWERING CIRCUIT WITH DUAL OUTPUTS

[75] Inventors: Hideki Miyazaki; Kenichi Onda; Yasuo Matsuda, all of Hitachi, Japan

[73] Assignee: Hitachi, Ltd., Tokyo, Japan

[21] Appl. No.: 213,134

[22] Filed: Jun. 29, 1988

[30] Foreign Application Priority Data

Jul. 1, 1987 [JP] Japan ............................. 62-162353
Nov. 24, 1987 [JP] Japan ............................. 62-294148

[51] Int. Cl.$^4$ ............................................ H02M 3/06
[52] U.S. Cl. ................................................ 363/62; 320/1
[58] Field of Search ..................... 307/11, 109; 320/1; 363/62

[56] References Cited

U.S. PATENT DOCUMENTS 4,485,432 11/1984 Kidena et al. ......................... 363/62
4,578,772 3/1985 Fuji ......................................... 320/1
4,654,769 3/1987 Middlebrook ........................ 363/62
4,750,099 6/1988 Inoue et al. ............................ 320/1

Primary Examiner—Patrick R. Salce
Assistant Examiner—Jeffrey Sterrett
Attorney, Agent, or Firm—Antonelli, Terry & Wands

[57] ABSTRACT

A power supply circuit comprises first charge storing means, second and third charge storing means supplying their charged voltages so as to be used as sources of predetermined voltages applied to associated loads respectively, switch means capable of selectively establishing at least a first mode and a second mode so that, in the first mode, the first and second charge storing means are connected in series with a d.c. power source to be charged by a power supply voltage, while, in the second mode, the first charge storing means is electrically isolated from the d.c. power source and the second charge storing means, and the third charge storing means is connected to the first charge storing means in a closed circuit to be charged by the charges stored in the first charge storing means, and a drive circuit driving the switch means so that the switch means repeats an operation cycle including at least the first mode and the second mode executed in that order.

6 Claims, 10 Drawing Sheets

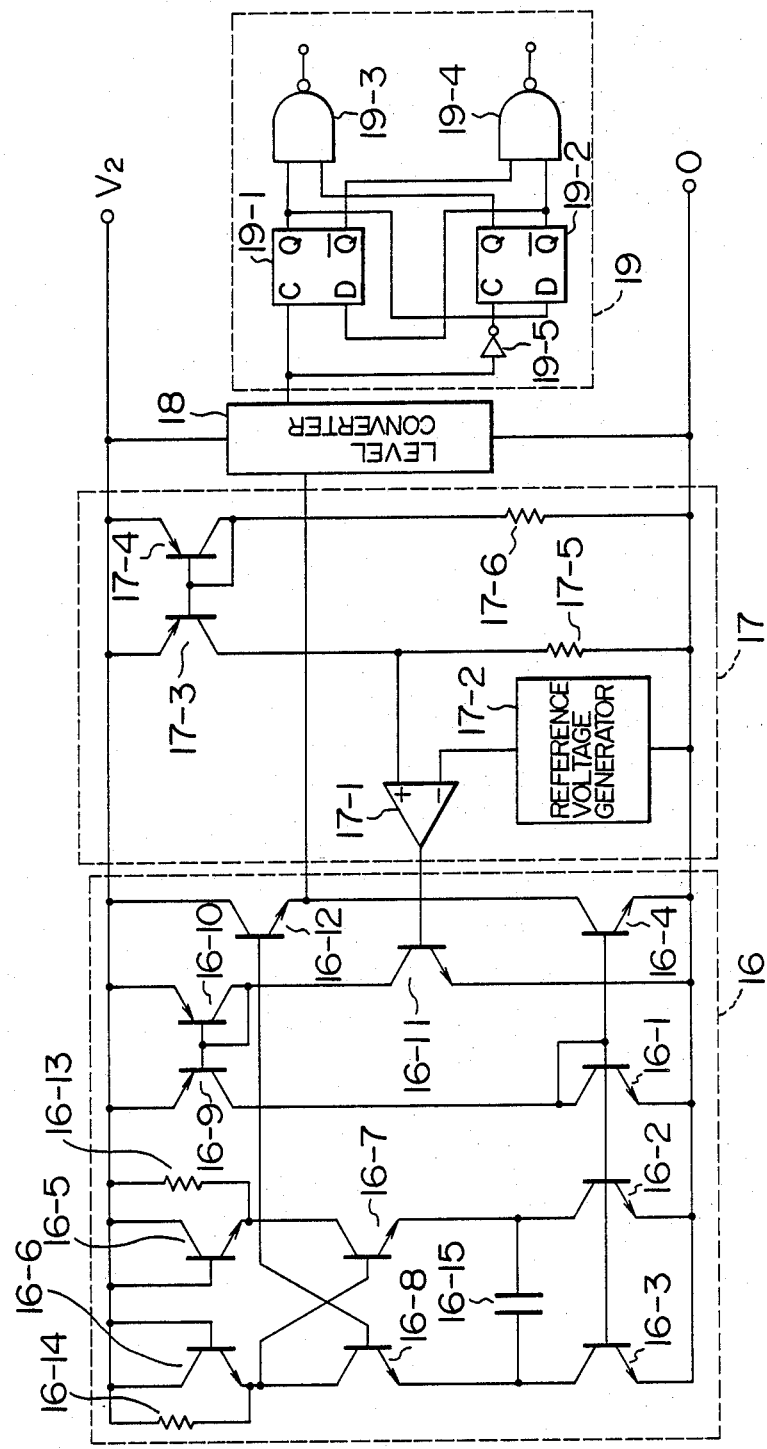
F I G. 5

F I G. 7
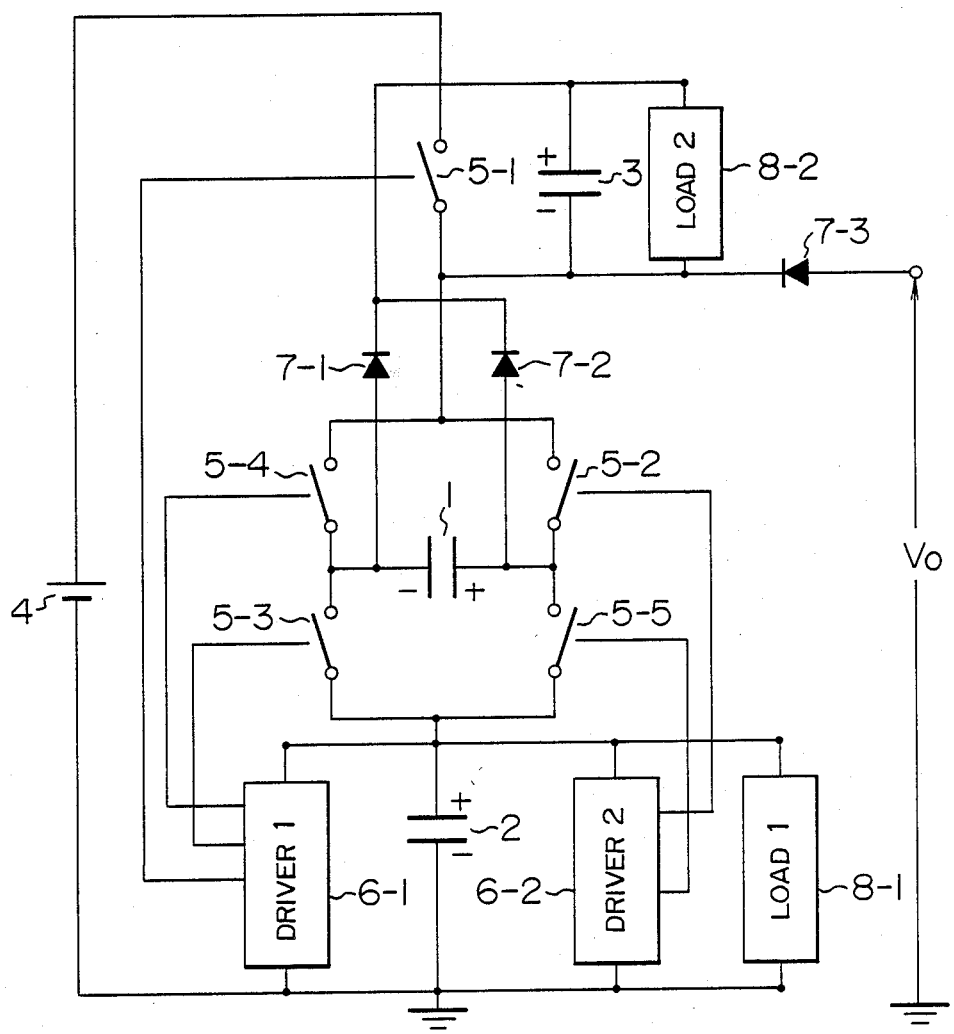

CAPACITIVE VOLTAGE LOWERING CIRCUIT WITH DUAL OUTPUTS

BACKGROUND OF THE INVENTION

1. FIELD OF THE INVENTION

This invention relates to a power supply circuit, and more particularly to a power supply circuit which is incorporated in a power IC obtained by monolithic integration of power semiconductor elements having a high blocking voltage capability and a large current handling capability and drive circuits for driving the power semiconductor elements and which is suitable for use as a means for supplying power required for driving the power semiconductor elements.

2. DESCRIPTION OF THE RELATED ART

A power IC obtained by monolithic integration of output semiconductor elements having a high blocking voltage capability and a large current handling capability and drive circuits driving these semiconductor elements requires generally two input power sources, that is a first power source for suppling a required voltage to the output semiconductor elements and a second power source for supplying a voltage lower than that of the first power source to the drive circuits. When the output semiconductor elements are, for example, N-channel MOS transistors constituting a three-phase inverter, four voltage sources having different reference levels of the drive voltage are required as the second power source, and it has been a prior art practice to supply such voltages insulated by insulating transformers respectively. However, because such a method is inconvenient, it has been proposed to incorporate the second power source of the kind described above in the IC itself.

As prior art disclosures proposing incorporation of such power supplying means in an IC, methods described in, for example, Japanese patent unexamined publication JP-A-59-15331, "Nikkei Electronics, January 26, 1987, page 154" and GE Application Note entitled "GES mart TM MODULE SIMPLIFIES MOTOR DRIVE DESIGN" November, 1985 pages 1-12 are known. In the circuit described in the latter, IGBT's (insulated gate bipolar transistors) are connected in a half bridge circuit as output semiconductor elements to be controlled by a control IC, and voltage sources having different reference voltages levels are required for the IGBT's disposed in the upper and lower stages of the output part respectively.

Externally applied input voltages include a d.c. voltage Vdc applied to the IGBT's in the output part and a power supply voltage Vcc required for the control IC.

The power supply voltage Vcc is directly used to drive the lower-stage IGBT's because the level of the reference voltage is the ground potential. On the other hand, the reference voltage level of the voltage source driving the upper-stage IGBT's changes depending on the operating state of the IGBT's in the output part. That is, this reference voltage is Vdc/2 when both the upper-stage and lower-stage IGBT's are in their off state, but the reference voltage is Vdc when the upper-stage IGBT is in its on state and the lower-stage IGBT is in its off state.

According to the latter prior art method, a capacitor is connected between the collector terminal of the lower-stage IGBT and the gate terminal of the upper-stage IGBT, and the lower-stage IGBT is used as switch means to establish a circuit state in which the voltage source applying the power supply voltage Vcc to the control IC is connected in series with the capacitor, so that the control IC has the function of supplying charges to the capacitor to charge the capacitor.

Although such a method is advantageous in that Vcc only is required as a drive input, no consideration is given to produce Vcc itself from the d.c. voltage Vdc.

Thus, in the prior art power supply circuit, no consideration is given to an idea in which the d.c. voltage input Vdc applied to the output semiconductor elements is lowered by means of a low-loss voltage lowering circuit so as to produce the power supply voltage input Vcc applied to the control IC. Therefore, the prior art power supply circuit has had the problem that two kinds of input voltage sources are still required.

In addition to the primary function of controlling the load current, the lower-stage IGBT in the output part has also the function of switch means for charging the capacitor as described above. Because the latter function has a priority over the former function, the prior art power supply circuit has had such another problem that the required control of the load current is temporarily interrupted during the period of charging the capacitor.

SUMMARY OF THE INVENTION

With a view to solve the prior art problems described above, it is an object of the present invention to provide a power supply circuit in which a low-loss voltage lowering circuit using capacitors is provided so that a plurality of voltages having different reference levels can be produced from a high input voltage corresponding to the power supply voltage Vcc referred to above.

Another object of the present invention is to provide a power supply circuit of the type described above which is incorporated in a power IC and operates independently of an output part of the power IC without affecting the control of load current supplied from the output part of the power IC.

In accordance with the present invention which attains the above object, there is provided a power supply circuit comprising first charge storing means, second and third charge storing means supplying their charged voltages so as to be used as sources of predetermined voltages applied to associated loads respectively, switch means capable of selectively establishing at least a first mode and a second mode so that, in the first mode, the first and second charge storing means are connected in series with a d.c. power source to be charged by a power supply voltage, while, in the second mode, the first charge storing means is electrically isolated from the d.c. power source and the second charge storing means, and the third charge storing means is connected to the first charge storing means in a closed circuit to be charged by the charges stored in the first charge storing means, and a drive circuit driving the switch means so that the switch means repeats an operation cycle including at least the first mode and the second mode executed in that order.

In a further preferred form of the present invention, the drive circuit includes means for controlling the repetition frequency of the operation cycle of the switch means on the basis of the charged voltage of one of the first, second and third charge storing means.

BRIEF DESCRIPTION OF THE DRAWINGS

FIG. 5 is a block circuit diagram showing the detailed structure of the drive circuit having the frequency control function described with reference to FIG. 1.

FIG. 7 is a block circuit diagram showing the basic structure of a second embodiment of the power supply circuit according to the present invention.

DESCRIPTION OF THE PREFERRED EMBODIMENTS

Preferred embodiments of the present invention will now be described in detail with reference to the drawings.

Figure 1:
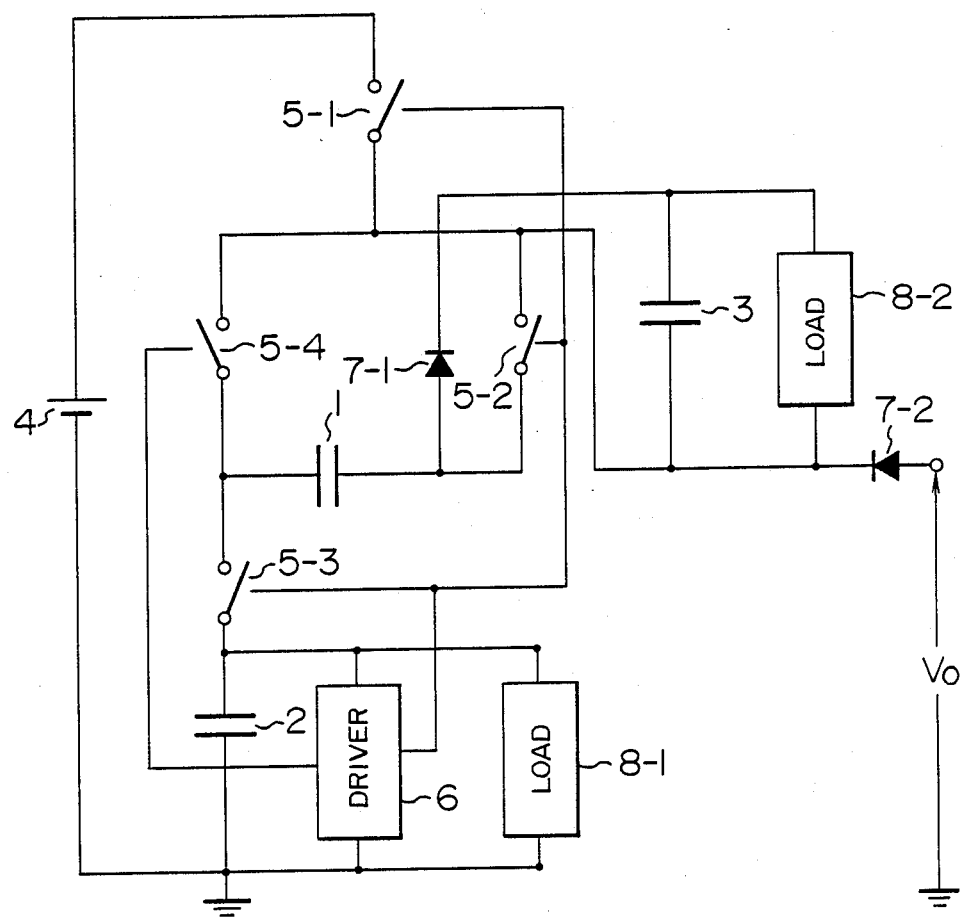
FIG. 1 is a block circuit diagram showing the basic structure of a first embodiment of the power supply circuit according to the present invention.
Figure 2A:
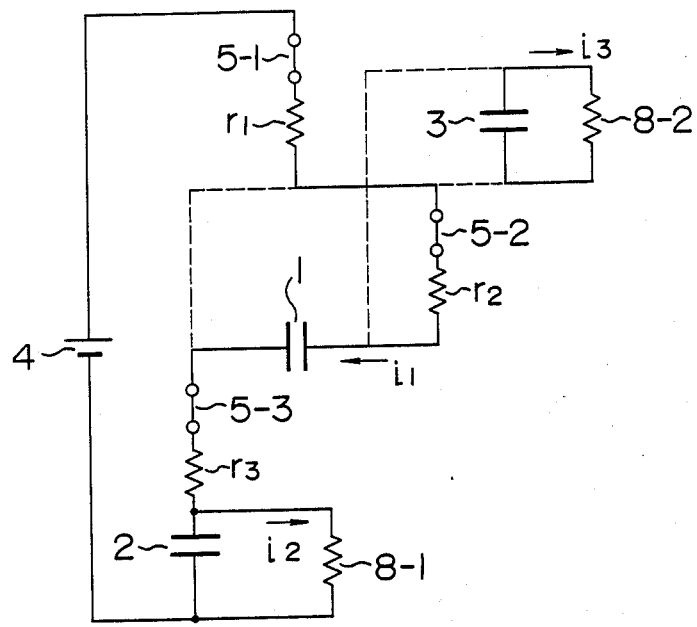
FIGS. 2A and 2B are equivalent circuit diagrams for illustrating the operation of the power supply circuit shown in FIG. 1.
Figure 2B:
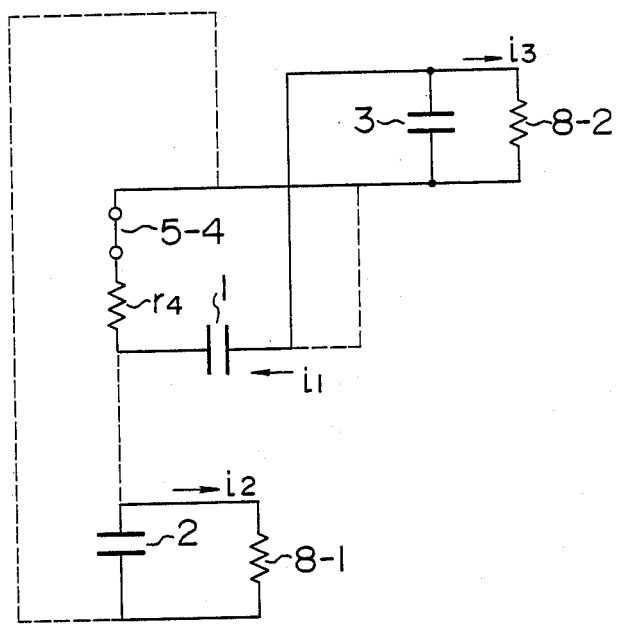
Figure 3:
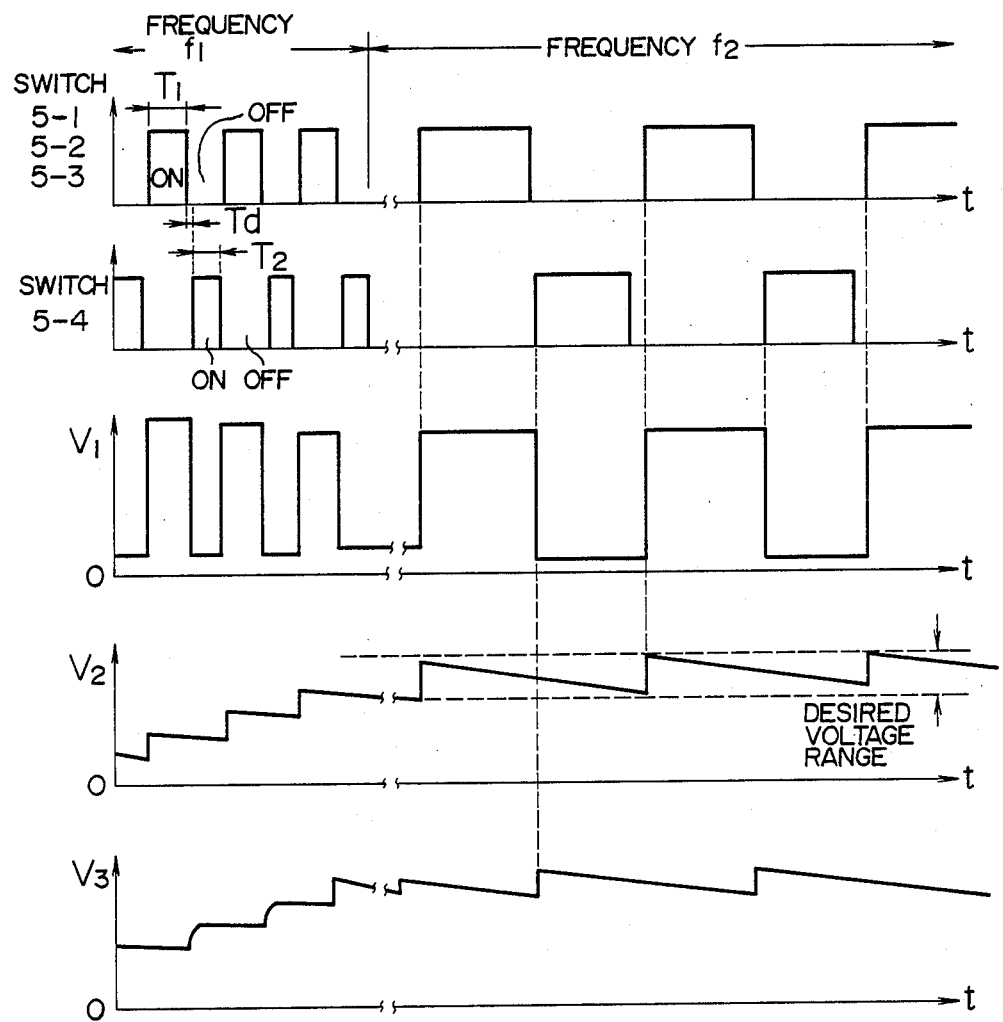
FIG. 3 is a time chart for illustrating the operation of the power supply circuit shown in FIG. 1.

FIG. 1 is a block circuit diagram showing the basic structure of a first embodiment of the power supply circuit according to the present invention, FIGS. 2A and 2B are equivalent circuit diagrams for illustrating the operation of the first embodiment, and FIG. 3 is a time chart of the operation of the first embodiment. Referring to FIG. 1, the first embodiment of the power supply circuit includes capacitors 1, 2 and 3, a voltage source 4, switches 5-1, 5-2, 5-3 and 5-4, a drive circuit 6 for selectively turning on and off the switches 5-1 to 5-4, diodes 7-1 and 7-2, and loads 8-1 and 8-2.

In the power supply circuit shown in FIG. 1, the voltage source 4 has a voltage value E, and the capacitors 1, 2 and 3 have electrostatic capacitance values C1, C2 and C3 respectively. The switch 5-1, capacitor 1, switches 5-2, 5-3 and capacitor 2 are connected in series with the voltage source 4 to form a closed circuit. The ground potential is a reference potential for this closed circuit.

Also, the capacitor 1, diode 7-1, capacitor 3 and switch 5-4 are connected in series to form a closed circuit. The loads 8-1 and 8-2 are connected across the capacitors 2 and 3 respectively, and a potential higher by Vo than the ground potential is a reference potential for the load 8-2. The switches 5-1, 5-2, 5-3 and the switch 5-4 are alternately turned on, and the drive circuit 6 controls the on-off of these switches. By turning on the switches 5-1, 5-2, 5-3 and turning off the switch 5-4, the drive circuit 6 establishes a first circuit state (referred to hereinafter as a mode 1), and, by turning off the switches 5-1, 5-2, 5-3 and turning on the switch 5-4, the drive circuit 6 establishes a second circuit state (referred to hereinafter as a mode 2). The drive circuit 6 functions to alternately repeat the mode 1 and mode 2 and has also the function of controlling the frequency of mode repetition depending on the voltage charged in one of the capacitors 1, 2 and 3 as described later. FIGS. 2A and 2B show the circuit state of mode 1 and that of mode 2 by equivalent circuits respectively. In FIGS. 2A and 2B, the switches 5-1, 5-2, 5-3 and 5-4 shown in FIG. 1 are represented by ideal switches 5-1 to 5-4 having zero resistance values and their on resistances r1 to r4 respectively.

In the mode 1 shown in FIG. 2A, it will be seen that the switches 5-1 to 5-3 are turned on, while the switch 5-4 is turned off, and the closed circuit composed of the voltage source 4, resistors r1, r2, capacitor 1, resistor r3 and capacitor 2 is formed to charge the capacitors 1 and 2.

On the other hand, in the mode 2 shown in FIG. 2B, it will be seen that the switches 5-1 to 5-3 are turned off, while the switch 5-4 is turned on, and the closed circuit composed of the capacitors 1, 3 and resistor r4 is formed so that the charges stored in the capacitor 1 under the mode 1 are now transferred to the capacitor 3. In FIG. 2B, the diode 7-1 shown in FIG. 1 is not shown for the sake of simplicity of illustration. In each of FIGS. 2A and 2B, it will be seen that power is supplied from the capacitors 2 and 3 to the associated loads 8-1 and 8-2 which are represented by resistors. Suppose that E is the voltage of the voltage source 4; C1, V1, C2, V2, C3 and V3 are capacitances and voltages of the capacitors 1, 2 and 3 respectively; R1 and R2 are resistances of the loads 8-1 and 8-2 respectively; and $i_1$, $i_2$ and $i_3$ are currents flowing into and out of the capacitors 1, 2 and 3 respectively. (The arrows show the positive direction of these currents $i_1$, $i_2$ and $i_3$.) Then, the circuit equations under the mode 1 and mode 2 can be expressed as follows:

Mode 1

$$C1 \frac{dV1}{dt} = i_1 \quad (1)$$

$$C2 \frac{dV2}{dt} = i_1 - i_2 \quad (2)$$

$$C3 \frac{dV3}{dt} = -i_3 \quad (3)$$

$$E = (r1 + r2 + r3)i_1 + V1 + V2 \quad (4)$$
$$V2 = R1 \cdot i_2 \quad (5)$$
$$V3 = R2 \cdot i_3 \quad (6)$$

Mode 2

$$C1 \frac{dV1}{dt} = i_1 \quad (7)$$

$$C2 \frac{dV2}{dt} = -i_2 \quad (8)$$

$$C3 \frac{dV3}{dt} = -i_1 - i_3 \quad (9)$$

$$V1 = V3 - r4 \cdot i_1 \quad (10)$$
$$V2 = R1 \cdot i_2 \quad (11)$$
$$V3 = R2 \cdot i_3 \quad (12)$$

General solutions of the above equations can be derived by the use of the initial conditions during alternate change-over between the mode 1 and the mode 2. However, the calculation will not be described herein because of the complexity.

FIG. 3 is a time chart showing on-off of the switches 5-1, 5-2, 5-3 and 5-4 and resultant changes in the voltages V1, V2 and V3 charged in the respective capacitors 1, 2 and 3. In FIG. 3, periods $T_1$ and $T_2$ represent the mode 1 shown in FIG. 2A and the mode 2 shown in FIG. 2B respectively. A dead time Td is provided between the periods $T_1$ and $T_2$ so as to avoid an overlap between the mode 1 and the mode 2. The time chart of FIG. 3 is based on the premise that there is the relation C1<C2, C3 between the capacitance values of the capacitors 1, 2 and 3.

In the period $T_1$ in which the circuit state is placed in the mode 1, the same quantity of charges is stored in each of the capacitors 1 and 2 when the loads are not taken into account. However, because of the relation C1<C2, the relation between the charged voltages V1 and V2 of the respective capacitors 1 and 2 is given by V1<V2. Then, in the period $T_2$ in which the circuit state is placed in the mode 2, the same voltage is charged in each of the capacitors 1 and 3 when the loads are not taken into account. However, because of the relation C1<C3, the voltage V1 shows a large voltage drop when compared to an increase in the voltage V3.

The voltages charged in the capacitors 2 and 3 decrease as they supply currents to the loads 8-1 and 8-2 respectively. However, the frequency of repetition of the mode 1 and mode 2 is high as shown by $f_1$ in FIG. 3, the quantity of charges stored in each of the capacitors 2 and 3 is larger than the quantity of charges supplied to the associated load, and the voltage charged in each of the capacitors 2 and 3 increases. When the charged voltages of the capacitors 2 and 3 do not attain the desired values, the charging period of time can be shortened by increasing the mode repetition frequency. Then, when the charged voltages of the capacitors 2 and 3 attain their desired voltage ranges, the charged voltages can be maintained in the desired ranges by decreasing the mode repetition frequency as shown by $f_2$ in FIG. 3

The drive circuit 6 carries out the above manner of mode repetition frequency control. The detailed structure of the drive circuit 6 will be described later with reference to FIG. 5.

Figure 4:
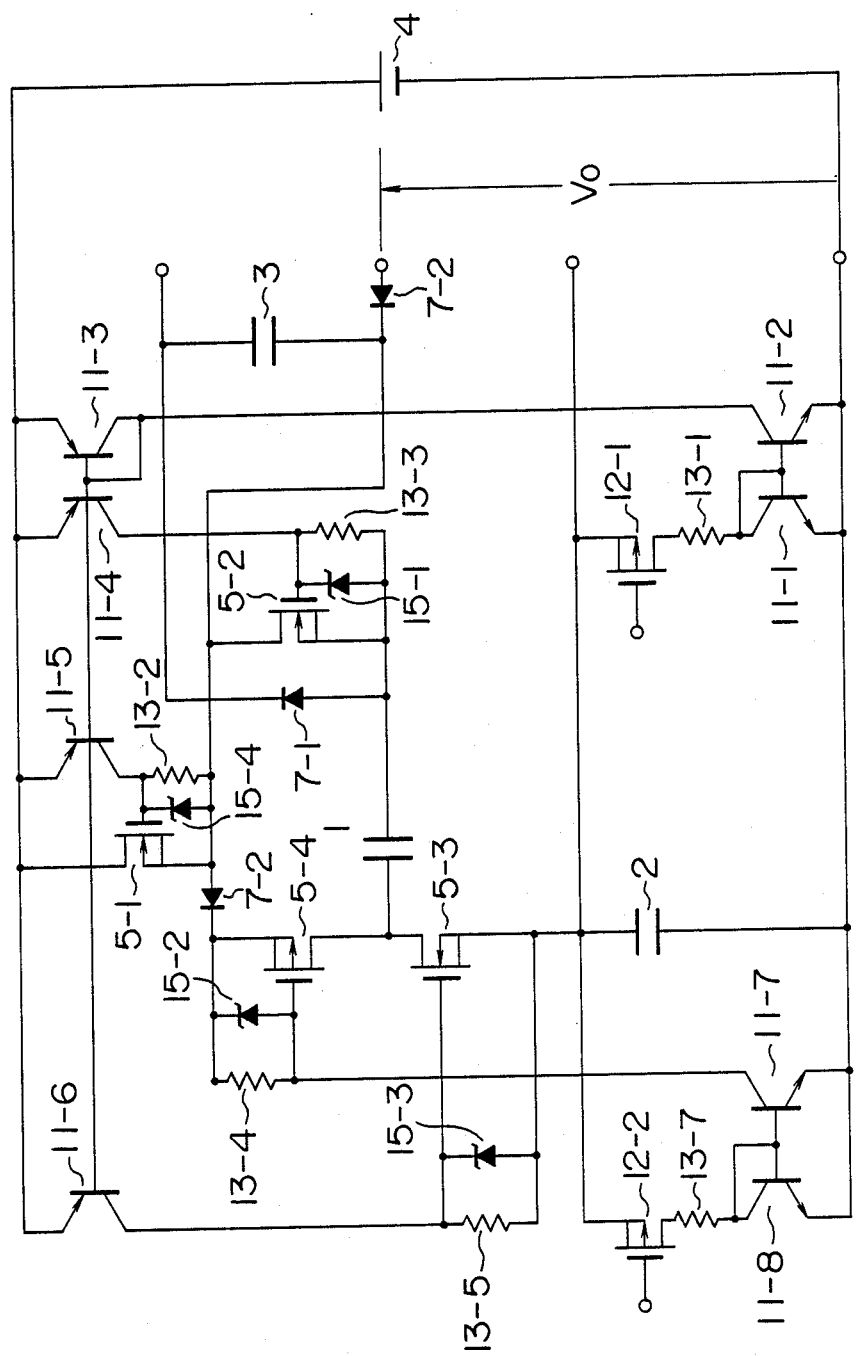
FIG. 4 is a circuit diagram showing one form of the practical structure of the power supply circuit of FIG. 1 in which a MOSFET is used to provide each of the switches.

FIG. 4 shows one form of the practical structure of the power supply circuit of FIG. 1 in which a MOSFET is used to provide each of the switches.

Referring to FIG. 4, each of the switches 5-1 to 5-3 shown in FIG. 1 is provided by an N-channel MOSFET, while the switch 5-4 is provided by a P-channel MOSFET. How to drive the MOSFET's 5-1 to 5-3 will now be described. In response to the application of a gate signal to the gate of a MOSFET 12-1, a second current mirror circuit composed of transistors 11-3, 11-4 and transistors 11-5, 11-6 is actuated through a first current mirror circuit composed of transistors 11-1 and 11-2. As a result, the MOSFET's 5-1, 5-2 and 5-3 are turned on by being biased at their gates by a constant current produced in the current mirror circuit and flowing through respective bias resistors 13-2, 13-3 and 13-5. On the other hand, in the case of the MOSFET 5-4, a third current mirror circuit composed of transistors 11-7 and 11-8 is actuated in response to the application of a gate signal to the gate of a MOSFET 12-2, and the MOSFET 5-4 is turned on by being biased at its gate by a constant current produced in the current mirror circuit and flowing through a bias resistor 13-4.

In the form of the power supply circuit shown in FIG. 4, the aforementioned circuit state of mode 1 is established by applying a gate signal to the MOSFET 12-1 so as to turn on this MOSFET 12-1 but not applying a gate signal to the MOSFET 12-2 so as not to turn on this MOSFET 12-2. On the other hand, the aforementioned circuit state of mode 2 is establilshed by applying a gate signal to the MOSFET 12-2 so as to turn on this MOSFET 12-2 but not applying a gate signal to the MOSFET 12-1 so as not to turn on this MOSFET 12-1.

In order that the voltage charged in the capacitor 2 in the embodiment shown in FIG. 4 can be maintained at the desired value within the allowable variable voltage range, it is necessary to control the frequency of the input signal applied to the gate of each of the MOSFET's 12-1 and 12-2 as described already.

FIG. 5 is a block circuit diagram showing one form of the practical structure of the drive circuit 6 shown in FIG. 1 and having the frequency control function described above. Referring to FIG. 5, the drive circuit 6 includes a VCO (voltage-controlled oscillator) 16, a base current control circuit 17, a level conversion circuit 18 and an output circuit 19.

The oscillation frequency of the VCO 16 can be changed by controlling base current supplied to a transistor 16-11, and the output of the VCO 16 is applied to the level conversion circuit 18.

The base current control circuit 17 detects the voltage V2 of the capacitor 2 so as to control the base current supplied to the transistor 16-11. More precisely, the base current control circuit 17 includes a current mirror circuit composed of transistors 17-3 and 17-4 to produce a constant current. This constant current flows through a resistor 17-5, and a voltage drop proportional to the charged voltage V2 of the capacitor 2, which is the voltage source of the drive circuit 6, occurs across the resistor 17-5. This voltage drop is compared in a comparator 17-1 with a reference voltage generated from a reference voltage generating circuit 17-2, and the base current supplied to the transistor 16-11 is controlled on the basis of the voltage difference.

The level conversion circuit 18 has a function of removing the quantity of offset in the oscillation output of the VCO 16. After the level conversion in the level conversion circuit 18, the frequency and duty factor of the oscillation output of the VCO 16 are suitably changed by the output circuit 19 which includes flip-flops 19-1, 19-2, NAND gates 19-3, 19-4 and an inverter 19-5. Output signals from the NAND gates 19-3 and 19-4 of the output circuit 19 are applied as the inputs to the gates of the respective MOSFET's 12-1 and 12-2 provided in the embodiment shown in FIG. 4.

In the practical form of the drive circuit 6 shown in FIG. 5, the charged voltage of the capacitor 2 is used for controlling the frequency. However, since the charged voltages of the capacitors 1, 2 and 3 are related with one another, the charged voltage of the capacitor 1 or 3 may be used for the purpose of frequency control.

Figure 6:
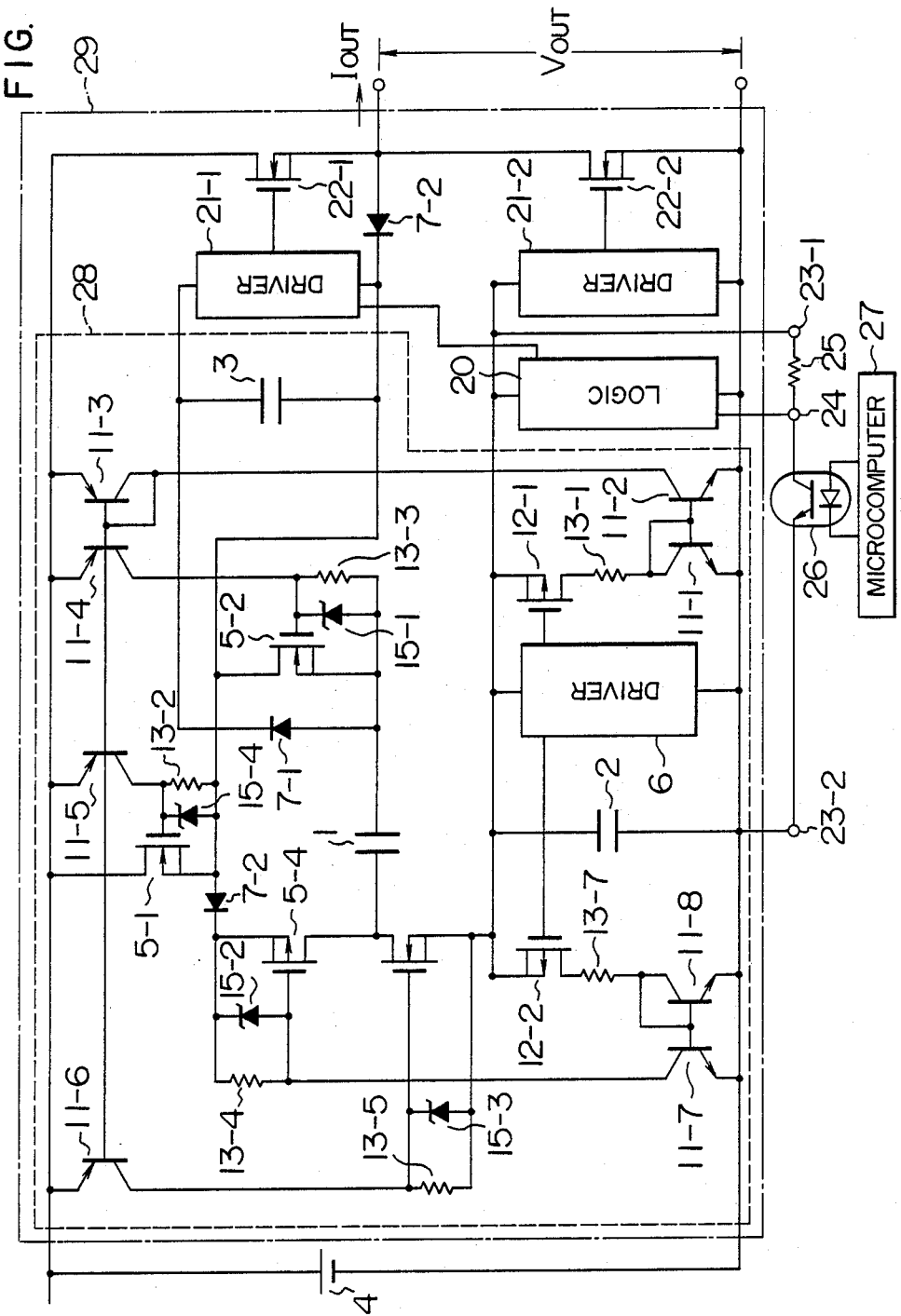
FIG. 6 is a block circuit diagram showing an application of the power supply circuit shown in FIG. 4 to the case of driving loads including MOS transistors.

FIG. 6 shows an application of the power supply circuit shown in FIG. 4 to the case of driving loads to which the voltages are supplied from the capacitors 2 and 3. More precisely, FIG. 6 shows that the power supply circuit shown in FIG. 4 is applied as a voltage source for drive circuits 21-1 and 21-2 which supply drive voltages to respective N-channel MOS output transistors 22-1 and 22-2 connected in a half bridge circuit. In FIG. 6, reference numerals 20, 26 and 27 designate a logic circuit, a photo coupler and a microcomputer respectively, and the power supply circuit shown in FIG. 4 is represented by a block 28 enclosed by broken lines. The logic circuit 20 and the drive circuits 21-1, 21-2 are those well known in the art and have not any direct concern with the present invention. Therefore, these parts are not be explained herein.

In the structure shown in FIG. 6, the voltage source 4 and the parts included in a block 29 enclosed by one-dot chain lines (except the large-capacity capacitors 2 and 3) can be integrated by monolithic integration in a semiconductor chip. In such a case, the power supply circuit 28 enclosed by the broken lines serves also as a power source for the logic circuit 20 and drive circuits 21-1, 21-2 integrated in the same IC. When the output transistor 22-2 is in its off state, the reference voltage value of the power source for the drive circuit 21-1 controlling on-off of the output transistor 22-1 must be the same as that of the voltage source 4, that is, it must be E. This requirement can be achieved by the application of the present invention.

Another feature of the structure shown in FIG. 6 in which the power supply circuit 28 is built in the IC is that output terminals 23-1 and 23-2 are provided so that the voltage charged in the capacitor 2 can be delivered to the outside of the IC. When the output transistors are connected in a half bridge circuit as shown or in a totem-pole circuit to form an inverter connected to an inductive load such as a motor requiring a high voltage, it has been necessary to employ means such as a photo coupler so as to apply electrically insulated signals to the drive circuits (including the logic circuit) controlling the output transistors. In such a case, anther power source is required for the photo coupler, and such a power source has been disposed outside of the IC including the drive circuits. However, according to the present invention, the photo coupler 26 can be connected between the output terminals 23-1 and 23-2, and any other power source disposed outside of the IC is unnecessary.

In FIG. 6, a resistor 25 is connected between the output terminal 23-1 and an input terminal 24, and the photo coupler 26 connected at its light receiving part between the input terminal 24 and the output terminal 23-2 receives a signal applied from the microcomputer 27. Thus, the charged voltage of the capacitor 2 is delivered to the outside of the IC so that it can be used to supply power to other devices.

FIG. 7 shows a second embodiment of the present invention, and, in FIG. 7, same reference numerals are used to designate like parts appearing in FIG. 1. Referring to FIG. 7, switches 5-1, 5-2, a capacitor 1, another switch 5-3, another capacitor 2 and a voltage source 4 form a closed circuit, and the capacitors 1 and 2 are charged in the polarities illustrated in FIG. 7, as in the case of the first embodiment shown in FIG. 1. This circuit state corresponds to the mode 1 described with reference to FIG. 2A.

Then, when another switch 5-4 is turned on, and the remaining switches 5-1 to 5-3 are turned off, a closed circuit composed of the capacitor 1, a diode 7-2, a capacitor 3 and the switch 5-4 is formed, and the charges stored in the capacitor 1 are transferred to the capacitor 3. This circuit state corresponds to the mode 2 described with reference to FIG. 2B.

The above operation of the second embodiment is similar to that of the first embodiment shown in FIG. 1. The second embodiment shown in FIG. 7 is featured by further having a mode 1' and a mode 2' described below in addition to the mode 1 and mode 2 described above.

More precisely, when the switches 5-1, 5-4 and 5-5 are turned on, and the switches 5-2 and 5-3 are turned off after the mode 2 is established, a closed circuit composed of the voltage source 4, switches 5-1, 5-4, capacitor 1, switch 5-5 and capacitor 2 is formed to charge the capacitors 1 and 2. In this case, the polarity of the charged voltage of the capacitor 1 is opposite to that illustrated in FIG. 7, and the polarity of the charged voltage of the capacitor 2 is the same as that illustrated in FIG. 7. This cirsuit state is referred to as the mode 1'. Then, when the switch 5-2 is turned on, and the remaining switches are turned off, a closed circuit composed of the capacitor 1, diode 7-1, capacitor 3 and switch 5-2 is formed, and the charges stored in the capacitor 1 are transferred to the capacitor 3. This circuit state is referred to as the mode 2'. It will be seen from comparison between the mode 2 and the mode 2' that, although the polarity of the charged voltage of the capacitor 1 in the mode 2' differs from that in the mode 2, the polarity of the charged voltage of the capacitor 3 in the mode 2' is the same as that in the mode 2 because the connection of the circuit elements is changed.

The operation of the second embodiment shown in FIG. 7 will be described with reference to a time chart of FIG. 8.

Figure 8:
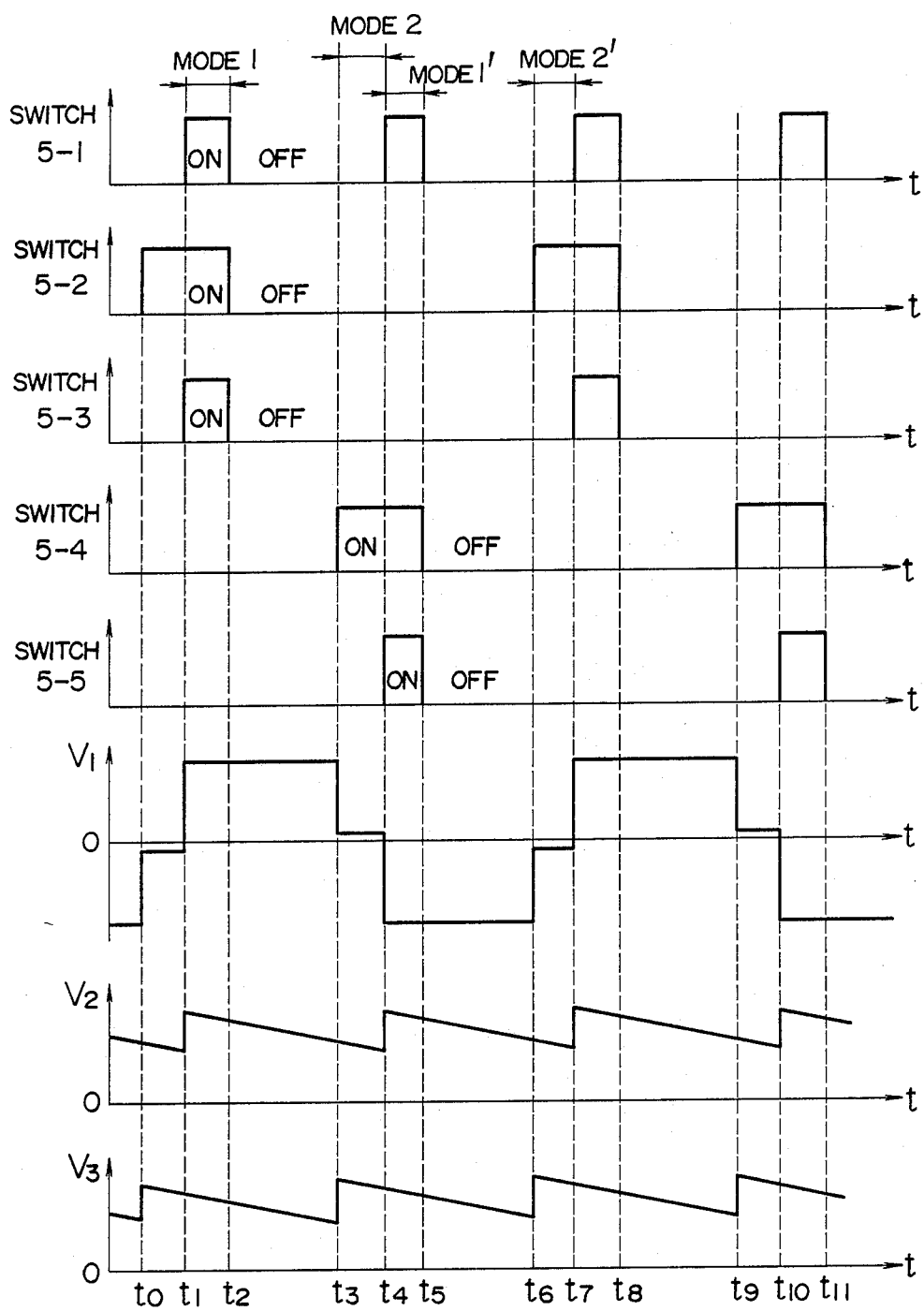
FIG. 8 is a time chart for illustrating the operation of the power supply circuit shown in FIG. 7.

In FIG. 8, the mode 1 is maintained for a period of from time $t_1$ to $t_2$, the mode 2 is maintained for a period of from time $t_3$ to $t_4$, the mode 1' is maintained for a period of from time $t_4$ to $t_5$, and the mode 2' is maintained for a period of from time $t_6$ to $t_7$. From the end of the mode 1 to the beginning of the mode 2 (that is, from time $t_2$ to time $t_3$), and from the end of the mode 1' to the beginning of the mode 2' (that is, from time $t_5$ to time $t_6$), all the switches 5-1 to 5-5 are in their off state, and the capacitors 2 and 3 supply current to loads 8-1 and 8-2 respectively. In the time chart of FIG. 3 described already, such discharging periods of the capacitors 2 and 3 are not shown. However, such a capacitor discharging period may be suitably selected as required. In the time chart of FIG. 8, the frequency of turning on-off the switches is fixed under assumption that the capacitor 2 is in its steady state in the time chart of FIG. 3, that is, the charged voltage of the capacitor 2 is in its desired range.

Figure 9:
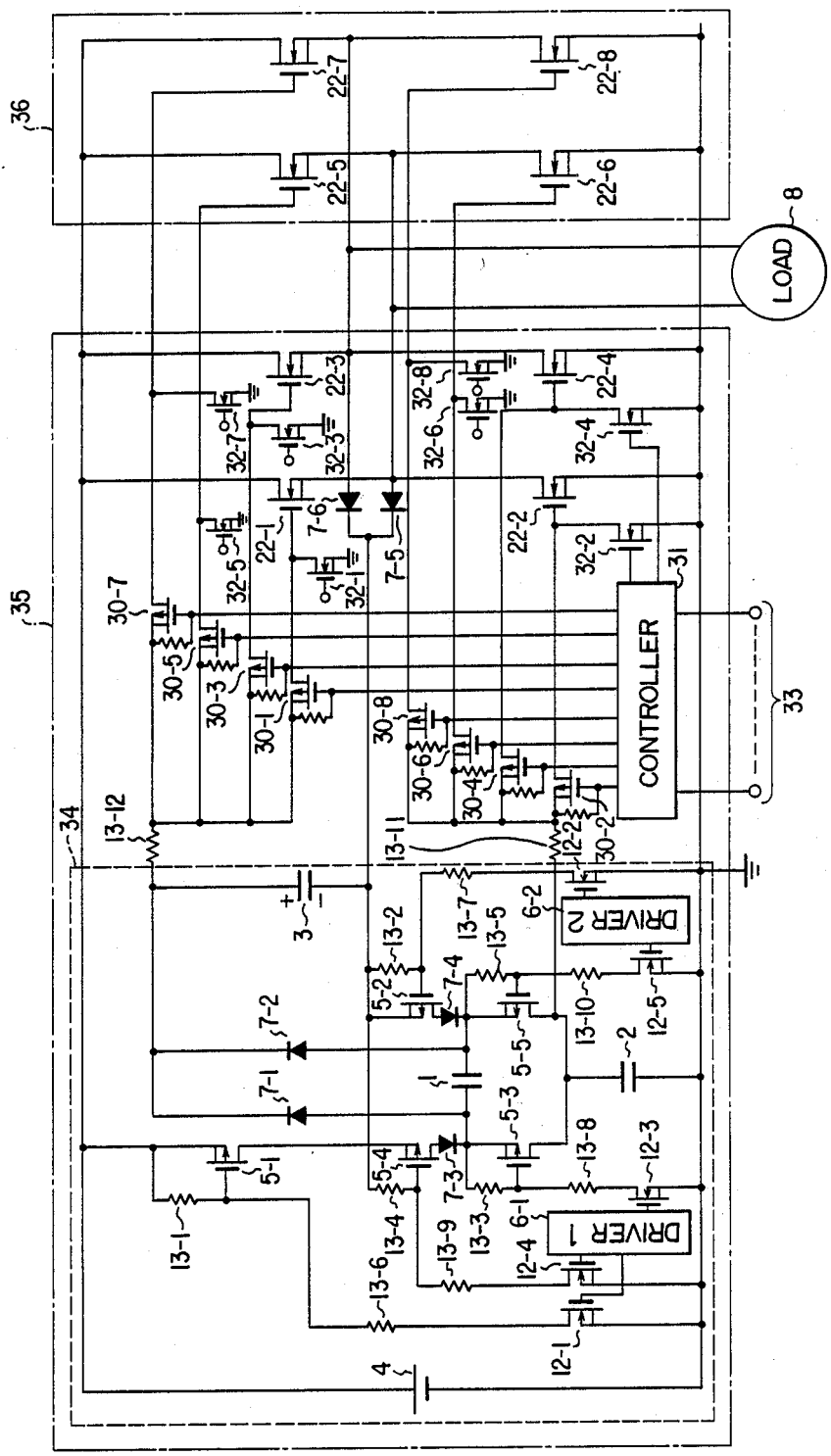
FIG. 9 is a practical circuit diagram showing an application of the power supply circuit of FIG. 7 to the case of driving loads including MOS transistors.

FIG. 9 shows an application of the present invention to a power converter which is, in this case, a three-phase inverter composed of N-channel MOS transistors 22-1 to 22-8. That is, FIG. 9 shows a practical circuit structure in which the second embodiment of the power supply circuit shown in FIG. 7 is used as a power source for drive circuits supplying a drive voltage to the MOS transistors of each phase. (In FIG. 9, those belonging to the two phases only are shown for the sake of simplicity of illustration.) The power supply circuit according to the present invention is represented by a block 34 enclosed by broken lines in FIG. 9. The remaining parts of the structure shown in FIG. 9 have not any direct concern with the present invention and will not be described herein.

Referring to FIG. 9, P-channel MOSFET's 5-1 to 5-5 function as the respective switches 5-1 to 5-5 shown in FIG. 7, and N-channel MOSFET's 12-1 to 12-5 function as switches driving the P-channel MOSFET's 5-1 to 5-5. The structure shown in FIG. 9 includes bias resistors 13-1 to 13-5, a control circuit 31 to which various input signals 33 are applied, P-channel MOSFET's 30-1 to 30-8, N-channel MOSFET's 32-1 to 32-8, N-channel MOSFET's 22-1 to 22-8 constituting the output part, diodes 7-1 to 7-6, and a load 8. The parts included in blocks 35 and 36 enclosed by one-dot chain lines are preferably integrated in single semiconductor substrates respectively. In the case of the capacitors 1, 2 and 3 among the parts included in the block 35 enclosed by the one-dot chain lines, at least one of them or preferably all of them may be externally mounted without being integrated in the semiconductor substrate.

Among the parts included in the block 34 enclosed by the broken lines, the voltage source 4, capacitors 1, 2, 3, and diodes 7-1, 7-2 are disposed at locations similar to those in the embodiment shown in FIG. 7. In the structure shown in FIG. 9, the switches 5-1 to 5-5 provided in the embodiment shown in FIG. 7 are provided by the combination of the P-channel MOSFET's 5-1 to 5-5 and the bias resistors 13-1 to 13-5 connected between the source and the gate of the associated MOSFET's 5-1 to 5-5 respectively. The N-channel MOSFET's 12-1 to 12-5 and resistors 13-6 to 13-10 are connected to the drive circuits 6-1 and 6-2 to turn on-off the P-channel MOSFET's 5-1 to 5-5.

The function of the diodes 7-3 and 7-4 is to prevent an adverse effect of parasitic diodes of the P-channel MOSFET's 5-1 to 5-5.

The operation of the parts of the power supply circuit represented by the block 34 is similar to that of the embodiment shown in FIG. 7 and will not be described herein.

In the embodiments described above, the reference voltage Vo of the load 8-2 is the reference potential for the charged voltage of the capacitor 3. However, as described with reference to FIG. 10 showing a third embodiment of the present invention, the reference potential may be the potential at the negative terminal of the voltage source 4 as in the case of the capacitor 2.

Figure 10:
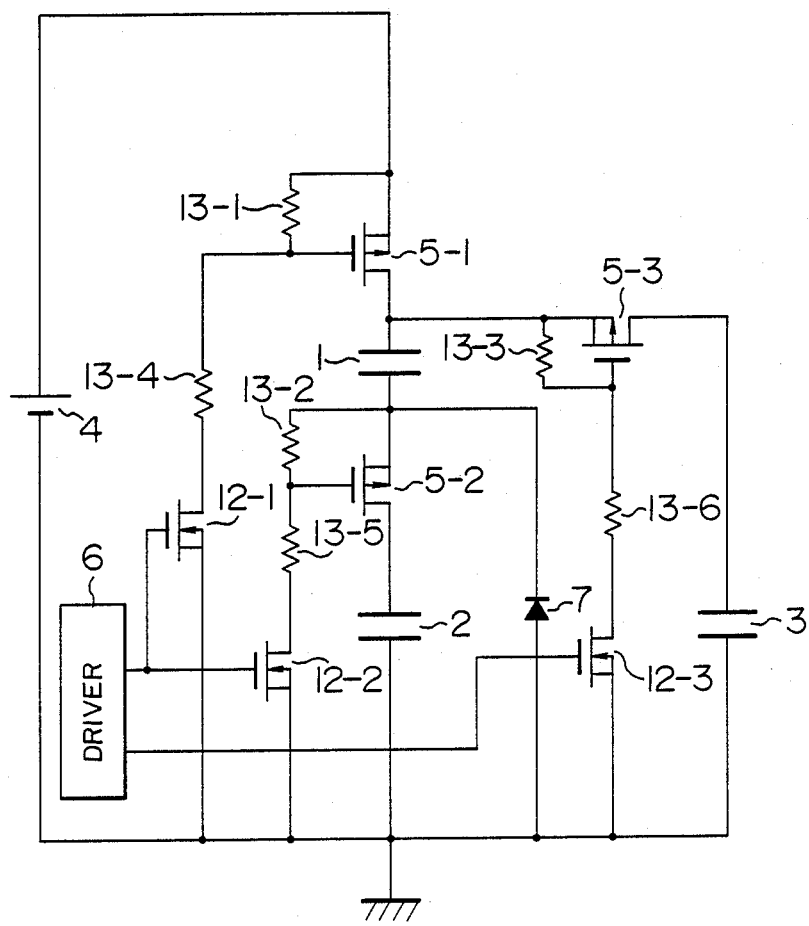
FIG. 10 is a block circuit diagram showing the structure of a third embodiment of the power supply circuit according to the present invention.

In the third embodiment shown in FIG. 10 in which like reference numerals are used to designate like parts appearing in FIG. 1, switches 5-1, 5-2 and 5-3 are provided by the combination of P-channel MOSFET's 5-1, 5-2 and 5-3, and resistors 13-1 to 13-6 respectively, as in the case of the circuit shown in FIG. 9, and are turned on-off by respective N-channel MOSFET's 12-1 to 12-3 connected to a drive circuit 6.

When the P-channel MOSFET's 5-1 and 5-2 are turned on while the P-channel MOSFET 5-3 is turned off, the aforementioned mode 1 is established to charge capacitors 1 and 2. On the other hand, when the P-channel MOSFET's 5-1 and 5-2 are turned off while the P-channel MOSFET 5-3 is turned on, the aforementioned mode 2 is establilshed, and the charges stored in the capacitor 1 are transferred by the route including the capacitor 1, P-channel MOSFET 5-3, capacitor 3 and diode 7 to charge the capacitor 3. As shown in FIG. 10, the reference potential for the capacitor 3 is common to that for the capacitor 2.

Thus, according to the third embodiment in which the capacitors 2 and 3 have the same reference potential, the capacitors 2 and 3 can be utilized as voltage sources supplying different voltage values by suitably selecting the capacitances of the capacitors 1, 2 and 3.

It will be understood from the foregoing detailed description that the power supply circuit of the present invention can produce a plurality of voltages having different reference potentials by greatly lowering a high input voltage by low-loss voltage lowering means.

We claim:
1. A power supply circuit comprising:
first charge storing means;
second and third charge storing means supplying their charged voltages so as to be used as sources of predetermined voltages applied to associated loads respectively;
switch means capable of selectively establishing at least a first mode and a second mode, so that, in said first mode, said first and second charge storing means are connected in series with a d.c. power source to be charged by a power supply voltage, while, in said second mode, said first charge storing means is electrically isolated from said d.c. power source and said second charge storing means, and said third charge storing means is connected to said first charge storing means in a closed circuit to be charged by the charges stored in said first charge storing means; and
a drive circuit driving said switch means so that said switch means repeats an operation cycle including at least said first mode and said second mode executed in that order.

2. A power supply circuit according to claim 1, wherein said drive circuit includes means for controlling the repetition frequency of the operation cycle of said switch means on the basis of the charged voltage of one of said first, second and third charge storing means.

3. A power supply circuit according to claim 1, wherein said switch means further establishes a third mode in which said first, second and third charge storing means are electrically isolated from each other and are also entirely electrically isolated from said d.c. power source, and said drive circuit drives said switch means so that said first, second and third modes are executed in that order in each of said repeated operation cycles.

4. A power supply circuit according to claim 1, wherein said switch means further establishes a third mode and a fourth mode, so that, in said third mode, said first and second charge storing means are connected in series with said d.c. power source, and said first charge storing means is charged in a polarity opposite to the polarity of charging in said first mode, but said second charge storing means is charged in the same polarity as the polarity of charging in said first mode, while, in said fourth mode, said first charge storing means is electrically isolated from said d.c. power source and said second charge storing means, but said third charge storing means is connected to said first charge storing means in a closed circuit to be charged in the same polarity as the polarity of charging in said second mode by the charges stored in said first charge storing means, and wherein said drive circuit drives said switch means so that said first, second, third and fourth modes are executed in that order in each of said repeated operation cycles.

5. A power supply circuit according to claim 4, wherein said switch means further establishes a fifth mode in which said first, second and third charge storing means are electrically isolated from each other and are also entirely isolated from said d.c. power source, and said drive circuit drives said switch means so that said fifth mode is executed between said first and second modes and between said third and fourth modes respectively in each of said repeated operation cycles.

6. A power supply circuit according to claim 1, wherein said first, second and third charge storing means, said switch means and said drive circuit are integrated in a single semiconductor substrate.

* * * * *